US012614721B2

(12) United States Patent
Oki et al.

(10) Patent No.:  US 12,614,721 B2
(45) Date of Patent:    Apr. 28, 2026

(54) NEGATIVE-ELECTRODE ACTIVE MATERIAL FOR SECONDARY BATTERIES, AND SECONDARY BATTERY

(71) Applicant: Panasonic Intellectual Property Management Co., Ltd., Osaka (JP)

(72) Inventors: Yukihiro Oki, Osaka Fu (JP); Kazuko Asano, Osaka Fu (JP); Nanami Takeda, Osaka Fu (JP); Mitsuhiro Hibino, Kyoto Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 632 days.

(21) Appl. No.: 18/014,842

(22) PCT Filed: Aug. 24, 2021

(86) PCT No.: PCT/JP2021/030981
§ 371 (c)(1),
(2) Date: Jan. 6, 2023

(87) PCT Pub. No.: WO2022/045128
PCT Pub. Date: Mar. 3, 2022

(65) Prior Publication Data
US 2023/0275220 A1      Aug. 31, 2023

(30) Foreign Application Priority Data
Aug. 31, 2020    (JP) ................................. 2020-146293
Sep. 28, 2020    (JP) ................................. 2020-162564

(51) Int. Cl.
*H01M 4/38*        (2006.01)
*H01M 4/02*        (2006.01)

(52) U.S. Cl.
CPC ...... *H01M 4/386* (2013.01); *H01M 2004/021* (2013.01); *H01M 2004/027* (2013.01)

(58) Field of Classification Search
None
See application file for complete search history.

(56) References Cited

U.S. PATENT DOCUMENTS 6,235,427  B1 *    5/2001    Idota ....................... H01M 4/58
                                                              429/223
6,835,496  B1     12/2004    Kaminaka et al.
                              (Continued)

FOREIGN PATENT DOCUMENTS

EP          1028476  A1      8/2000
EP          2581969  A2      4/2013
                    (Continued)

OTHER PUBLICATIONS

Guo, Yiming & Fredrickson, Daniel. (2016). PRINCEPS: A Computer-Based Approach to the Structural Description and Recognition of Trends within Structural Databases, and Its Application to the Ce—Ni—Si System. Crystals. 6. 35. 10.3390/cryst6040035 (Year: 2016).*

(Continued)

*Primary Examiner* — Maria V Ewald
*Assistant Examiner* — Suhani Jitendra Patel
(74) *Attorney, Agent, or Firm* — WHDA, LLP

(57)                ABSTRACT
A negative electrode active material for a secondary battery includes an intermetallic compound having a cage structure. The cage structure is constituted of at least one first atom located within a cage, and a plurality of second atoms arranged in a cage-like form so as to surround the first atom. The first atom is a cerium atom, and the plurality of the second atoms include 8 or more and 17 or less silicon atoms.

11 Claims, 9 Drawing Sheets

● : Si
○ : Ni
⊠ : Ce

Numbers in figure:
Numbering of Si atoms around Ce

(56) References Cited

U.S. PATENT DOCUMENTS

| | | | | |
|---|---|---|---|---|
| 2003/0175589 A1* | 9/2003 | Kaminaka | ............... | H01M 4/38 |
| | | | | 429/231.95 |
| 2004/0258993 A1* | 12/2004 | Matsuno | ............. | H01M 10/052 |
| | | | | 429/223 |
| 2005/0214643 A1* | 9/2005 | Matsuno | ................. | H01M 4/38 |
| | | | | 429/231.95 |
| 2010/0288982 A1* | 11/2010 | Le | .......................... | B82Y 30/00 |
| | | | | 420/129 |
| 2012/0264015 A1 | 10/2012 | Jung et al. | | |
| 2017/0214041 A1 | 7/2017 | Minami et al. | | |

FOREIGN PATENT DOCUMENTS

| | | |
|---|---|---|
| JP | 2004-335439 A | 11/2004 |
| JP | 2011-146388 A | 7/2011 |
| JP | 2012-526920 A | 11/2012 |
| WO | 2016/35290 A1 | 3/2016 |

OTHER PUBLICATIONS

J.J. Lu, M.K. Lee, Y.M. Lu, J.F. Chou, L.Y. Jang, 4f-Ligand dehybridization in the intermetallic compound series CeNi2(SnxSi1-x)2, Solid State Communications, vol. 135, Issue 8, 2005 (Year: 2005).*

Extended (Supplementary) European Search Report dated Jan. 22, 2024, issued in counterpart EP Application No. 21861553.2. (11 pages).

The Materials Project, Materials Data on Ce(SiNi)2 by Materials Project, Dataset, osti.gov, Jul. 15, 2020, XP093118225. https://www.osti.gov/biblio/1208239. (3 pages).

Guo Y. et al., PRINCEPS: A Computer-Based Approach to the Structural Description and Recognition of Trends within Structural Databases, and Its Application to the Ce—Ni—Si System, crystals, vol. 6, No. 4, pp. 1-33, Apr. 1, 2016, XP093117713.(33 pages).

The Materials Project, Materials Data on Ce(FeSi)2 by Materials Project, Dataset, DOE Data Explorer, Jul. 14, 2020, XP093118233. https://www.osti.gov/dataexplorer/biblio/dataset/1204764. (3 pages).

Yashima, "Research on Ce—Si valence fluctuation states", summaries of doctorate thesis and examination results, Graduate School of Science and Faculty of Science, Tohoku University, Science Doctorates, No. 796, pp. 9-13, 1982, cited in ISR, w/English partial translation (9 pages).

International Search Report dated Oct. 26, 2021, issued in counterpart International Application No. PCT/JP2021/030981 (2 pages).

Office Action dated May 16, 2025, issued in counterpart CN Application No. 202180053184.6, with partial English translation. (12 pages).

Mondolfo, L., Aluminum Alloys: Structure and Properties, Metallurgical Industry Press, p. 406, 1988, with English Abstract (6 pages); cited in CN Office Action dated May 16, 2025.

Domi, Y. et al., Improved Electrochemical Performance of Lanthanum Silicide/Silicon Composite Electrode with Nickel Substitution for Lithium-Ion Batteries, The Journal of Physical Chemistry C, vol. 120, No. 30, p. 16333-16339, 2016 (7 pages); cited in CN Office Action dated May 16, 2025.

* cited by examiner

● : Si

○ : Ni

▧ : Ce

Numbers in figure:
Numbering of Si atoms around Ce

● : Si

○ : Ni

▧ : Ce

Numbers in figure:
Numbering of Si atoms around Ce

● : Sn

◯ : Ni

▨ : La

Numbers in figure:
Numbering of Sn atoms around La

● : Si

○ : Ni

▦ : Ti

● : Si

○ : Mn

▦ : La

Numbers in figure:
Numbering of Si atoms around La

NEGATIVE-ELECTRODE ACTIVE MATERIAL FOR SECONDARY BATTERIES, AND SECONDARY BATTERY

CROSS-REFERENCE TO RELATED APPLICATIONS

This application is a National Phase Application filed under 35 U.S.C. § 371 of International Application No. PCT/JP2021/030981 filed on Aug. 24, 2021 which claims the benefit of priority under 35 U.S.C. § 119 (a) of Japanese Patent Applications No. 2020-146293 filed on Aug. 31, 2020 and No. 2020-162564 filed on Sep. 28, 2020 in Japan, the contents of which are incorporated herein by reference.

TECHNICAL FIELD

The present disclosure mainly relates to a negative electrode active material for a secondary battery.

BACKGROUND ART

Non-aqueous electrolyte secondary batteries, especially lithium ion secondary batteries, because of their high voltage and high energy density, have been expected as promising power sources for small consumer applications, power storage devices, and electric cars. With increasing demand for a higher battery energy density, an alloy-type material containing silicon (Si) that forms an alloy with lithium has been expected to be utilized as a negative electrode active material having a high theoretical capacity density (e.g., Patent Literature 1). It is known, however, that the alloy-type material undergoes great changes in volume associated with charge and discharge.

On the other hand, an intermetallic compound having a cage structure and containing Sn as a major component undergoes small changes in volume associated with insertion and desorption of lithium ions, and is therefore attractive as a negative electrode active material. For example, Patent Literature 2 proposes an electrode material for a non-aqueous electrolyte battery including an alloy which includes, as a main phase, an intermetallic compound phase containing an R element, Sn, an M element and a Z element, as essential components, and has a composition represented by a general formula: $R_aSn_bM_cT_dX_eA_fZ_g$. Here, R is at least one element selected from rare earth elements; M is at least one element selected from the group consisting of Co, Ni, Fe, Cu, Mn, V, and Cr; T is at least one element selected from the group consisting of Ti, Zr, Hf, Nb, Ta, Mo, and W; X is at least one element selected from the group consisting of Si, Al, Sb, and In; A is at least one element selected from the group consisting of Mg, Ca, Sr, and Ba; Z is at least one element selected from the group consisting of C, N, B, and P; and a, b, c, d, e, f, and g satisfy $a+b+c+d+e+f+g=100$ atom %, and $5 \leq a \leq 35$, $38 \leq b \leq 55$, $8 \leq c \leq 30$, $0 \leq d \leq 10$, $0 \leq e \leq 20$, $0 \leq f \leq 20$, and $0 < g \leq 30$, respectively.

CITATION LIST

Patent Literature

Patent Literature 1: International Publication WO2016/35290

Patent Literature 2: Japanese Laid-Open Patent Publication No. 2011-146388

SUMMARY OF INVENTION

The intermetallic compound disclosed in Patent Literature 2 includes Sn element as a major component, leading to an increased weight of the secondary battery, and is not suited to mobile applications. For example, in the application for electric cars, in order to increase the cruising range, a lighter element is required to be utilized. Moreover, since Sn is a rare element, the manufacturing cost of the battery might increase when a material containing Sn is used as a major component.

In view of the above, one aspect of the present disclosure relates to a negative electrode active material for a secondary battery, including an intermetallic compound having a cage structure, wherein the cage structure is constituted of at least one first atom located within a cage, and a plurality of second atoms arranged in a cage-like form so as to surround the first atom, the first atom is a cerin atom, and the plurality of the second atoms include S or more and 16 or less silicon atoms.

Another aspect of the present disclosure relates to a secondary battery, including: a positive electrode; a negative electrode; and an electrolyte, wherein the negative electrode includes the above-mentioned negative electrode active material for a secondary battery.

The present disclosure proposes utilizing an intermetallic compound which is lightweight and inexpensive and is capable of insertion and desorption of lithium ions, as a negative electrode active material for a secondary battery.

DESCRIPTION OF EMBODIMENTS

Figure 1A:
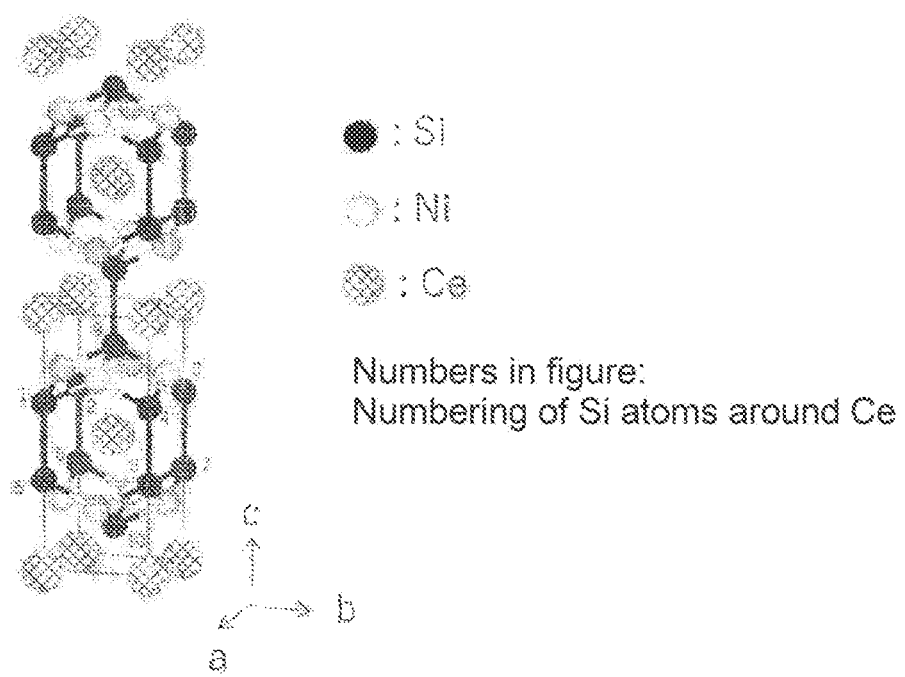
FIG. 1A A diagram showing a crystal structure of a negative electrode active material ($CeNi_2Si_2$) according to one embodiment of the present disclosure.

[Negative Electrode Active Material for Secondary Battery]

A negative electrode active material for a secondary battery according to an embodiment of the present disclosure includes an intermetallic compound having a cage structure. Here, the cage structure refers to a cage-type (basket-type) structure formed of predetermined atoms in the crystal structure. Specifically, the cage structure is constituted of at least one first atom located within a cage, and a plurality of second atoms arranged in a cage-like form so as to surround the first atom. The first atom can be, for example, one central atom located at the center of the cage. The second atoms are arranged so as to surround the first atom or the central atom, forming the cage. Hereinafter, the second atoms are sometimes referred to as cage atoms. The cage structure is, typically, when assuming a polyhedron with its vertices being the cage atoms, a structure having one central atom within a space defined by the polyhedron.

In order for the insertion and desorption of lithium ions to proceed stably, the crystal structure should have a cage structure. Also, the magnitude of the capacity developed through insertion and desorption of lithium ions greatly depends on the kinds of the first and second atoms. When the first atom is a cerium atom, and the plurality of the second atoms include 8 or more and 16 or less silicon atoms, the intermetallic compound having a cage structure has a high capacity density (mAh/g). Although the details of the cor-relation between the capacity density and the kinds of atoms are unclear, it is considered desirable to select, as the first atom, a metal atom whose electronegativity is relatively low, and as the second atoms, a metal atom whose electronega-tivity is relatively high.

In the intermetallic compound having a cage structure, not all the atoms should be forming a cage structure. Part of the atoms constituting the intermetallic compound may be located at the site other than the cage structure, and may form another structure. Furthermore, not all the cage struc-tures included in the intermetallic compound should have a cerium atom as the first atom and 8 or more and 16 or less silicon atoms as the second atoms. However, desirably, a half or more of the cage structures included in the interme-tallic compound each have a cerium atom as the first atom and 8 or more and 16 or less silicon atoms as the second atoms. Various modifications are possible in the crystal structure of the intermetallic compound and the kinds of elements, as long as the intermetallic compound can develop a high practical capacity (e.g., 80 mAh/g or more).

The intermetallic compound may include a subphase or impurity phase (e.g., $CeSi_2$, $CeNiSi_2$). The content of the subphase or impurity phase is desirably within a range in which the intermetallic compound can develop a high prac-tical capacity (e.g., 80 mAh/g or more), but is not limited thereto.

Hereinafter, an intermetallic compound having a cage structure constituted of at least one first atom located within a cage and a plurality of second atoms arranged in a cage-like form so as to surround the first atom, in which the first atom is a cerium atom, and the plurality of the second atoms include 8 or more and 16 or less silicon atoms is sometimes referred to as an "intermetallic compound CS."

A silicon atom (Si) has an atomic weight of 28.09 and is lighter in weight and less expensive than Su (atomic weight: 118.71). Furthermore, the intermetallic compound CS bas a capacity density of, for example, 100 mAh/g or more (further 140 mAh/g or more). Therefore, the intermetallic compound CS is extremely attractive as a negative electrode active material for a secondary battery used for mobile applications (e.g., electric car application).

The plurality of the second atoms preferably include one or more nickel atoms. When part of the plurality of the second atoms is a nickel atom, the capacity density of the intermetallic compound CS is further increased. At this time, the total number of the silicon atoms and the nickel atoms included in one cage structure may be 17 or more and 19 or less, and may be 18. In the plurality of the second atoms (cage atoms), the atomic ratio of the silicon atoms to the nickel atoms (Si/Ni ratio) may be, for example, 1 to 1.3, and may be, for example, 1.25.

When the plurality of the second atoms (cage atoms) do not include Ni, the number of the silicon atoms included in the cage atoms may be 11 to 13, and may be, for example, 12.

The intermetallic compound CS may have a phase of a composition represented by a general formula: $Ce_xNi_ySi_z$. The general formula satisfies x=1, 0≤y≤3, and 1≤z≤4. Although at least part of the Ce is the first atom, the intermetallic compound CS can contain Ce that is not located within the cage. Likewise, at least part of the Ni and the Si is the second atom (cage atom), but the intermetallic compound CS may contain Ni or Si that does not constitute the cage. Therefore, the ratio of (y+z) to x can be different from the ratio of the number of the second atoms to the number of the first atoms in the cage structure (e.g., 11 to 19). The ratio of (y+z) to x: (y+z)/x, may be, for example, 1.5 to 5, or 2 to 4, and may be, for example, 2 or 4.

When the plurality of the second atoms includes a nickel atom, the number of the nickel atoms included in the second atoms may be, for example, 7 or more and 9 or less. At this time, all the rest of the second atoms may be a silicon atom or an atom of another element. Even when the intermetallic compound CS contains an atom of an element other than Ce, Si and Ni, the intermetallic compound CS desirably has at least a phase having a composition represented by the general formula: $Ce_xNi_ySi_z$.

The number of the silicon atoms included in the second atoms is, for example, 10 in a preferred embodiment, and is, for example, 12 in another embodiment. Such an interme-tallic compound CS can form a stable cage structure, which can also enhance the overall stability of the crystal structure. Therefore, when the intermetallic compound CS is used as a negative electrode active material for a secondary battery, the deterioration in charge-discharge cycles becomes less likely to occur.

A specific example of the intermetallic compound CS is, for example, at least one phase selected from the group consisting of $CeNi_2Si_2$ and $CeSi_2$. In particular, $CeNi_2Si_2$ can develop a capacity density of 140 mAh/g or more.

FIG. 1A schematically shows a crystal structure of $CeNi_2Si_2$. In FIG. 1A, the unit lattice has a symmetry belonging to the I4/mmm space group. Two cage structures are included in the unit lattice near its central part. At the center of the cage, Ce is located as the central atom. Si and Ni are arranged in a cage-like form so as to surround Ce. In the illustrated example, the number of the cage atoms (here, the total number of Si and Ni) is 18, with the Si sites being 10 and the Ni sites being 8, but is not limited thereto. Various modifications can take place within a range in which the intermetallic compound can develop a high practical capac-ity (e.g., 80 mAh/g or more) or within a crystallographically acceptable range.

Figure 1B:
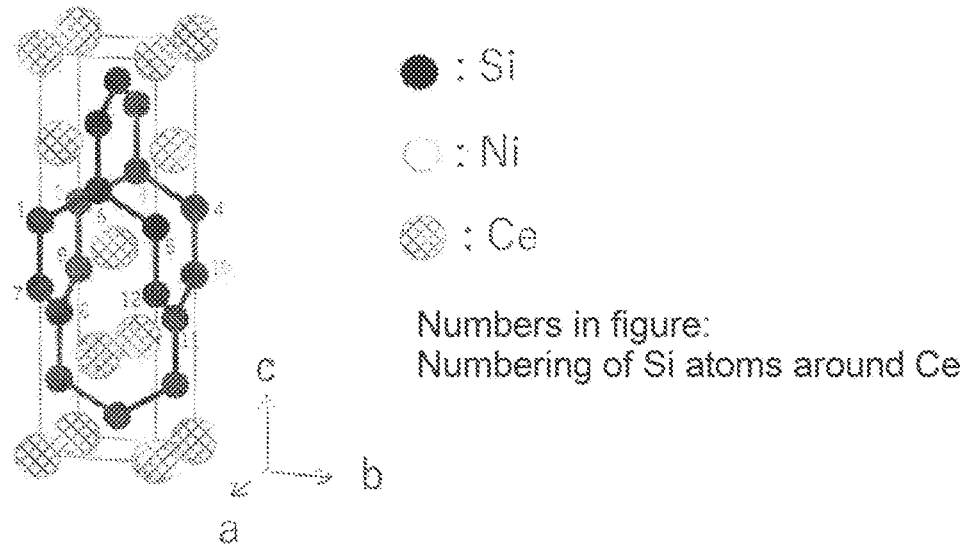
FIG. 1B A diagram showing a crystal structure of a negative electrode active material ($CeSi_2$) according to one embodiment of the present disclosure.

FIG. 1B schematically shows a crystal structure of $CeSi_2$. In FIG. 1B, the unit lattice has a symmetry belonging to the I41/amd space group. One cage structure is included in the unit lattice near its central part. Ce is located, as the central atom, at the center of the cage. Si is arranged in a cage-like form so as to surround Ce. In the illustrated example, the number of the cage atoms is 12, but is not limited thereto. Various modifications can take place within a range in which the intermetallic compound can exhibit a high practical capacity (e.g., 80 mAh/g or more) or within a crystallo-graphically acceptable range.

The presence of the intermetallic compound CS can be confirmed by X-ray diffractometry using CuKα rays. For example, the X-ray diffraction pattern of an intermetallic compound CS having a crystal structure of $CeNi_2Si_2$ or a crystal structure similar thereto has diffraction peaks (1) at or around $2\theta=23.9°$, (2) at or around $2\theta=35.8°$. (3) at or around $2\theta=36.6°$, and (4) at or around $2\theta=44.9°$.

The intermetallic compound CS belongs to a tetragonal or orthorhombic crystal system. For example, when the intermetallic compound CS having a crystal structure of $CeNi_2Si_2$ or a crystal structure similar thereto belongs to a tetragonal crystal system, the lattice constants a and c determined by X-ray diffractometry satisfy 3.0 Å≤a≤4.5 Å, and 7 Å≤c≤15 Å. When such an intermetallic compound CS belongs to an orthorhombic crystal system, the lattice constants a, b, and c determined by X-ray diffractometry satisfy 3.0 Å≤a≤45 Å, 3.0 Å≤b≤4.5 Å, and 7 Å≤c≤15 Å.

The lattice constants a and b, in a more stable crystal structure, preferably satisfy 3.9 Å≤a, and b≤4.2 Å, and further satisfy 4.0 Å≤a, and b≤4.1 Å. The lattice constant c, in a more stable crystal structure, preferably satisfies 8.0 Å≤c≤11.0 Å, and further satisfies 9.0 Å≤c≤10.0 Å.

For example, in an X-ray diffraction pattern of a typical intermetallic compound CS having a crystal structure of $CeNi_2Si_2$ or a crystal structure similar thereto, the d-value of a diffraction peak given by the hkl index of 112 is 2.38 Å or more and 2.52 Å or less, and is 2.40 Å or more and 2.50 Å or less.

The intermetallic compound CS may contain an atom Me different from any of Ce, Ni and Si. The atom Me may be incorporated into the crystal structure of a phase included in the intermetallic compound CS. In other words, the intermetallic compound CS may be a solid solution containing an Me element.

The atom Me is not limited, but Fe, La, Pr, Cr, Co, Al, C, Ca, Pb, Nd, Mg, Cu, Zn, and the like can be mentioned as examples of the atom Me. In particular, when an Fe-containing intermetallic compound CS is used as a negative electrode active material for a secondary battery, the capacity of the secondary battery and the workability with the material in the production process of the negative electrode can be effectively improved. Specifically, Fe has a function to improve the capacity of the intermetallic compound CS and a function to reduce the alkalinity of the intermetallic compound CS. Although the reason why the capacity is improved by Fe is unclear, it is considered that with the Fe-containing intermetallic compound CS, the conductivity and strength can be more improved than with the intermetallic compound CS not containing Fe. The changes in conductivity and strength are presumed to have relevance to the changes in capacity. In addition, due to a reduced alkalinity of the intermetallic compound CS, as described later, when preparing a negative electrode slurry of a negative electrode mixture dispersed in a dispersion medium, the stability of the negative electrode slurry can be improved.

Desirably, Fe is well dispersed in the intermetallic compound CS such that the presence thereof cannot be confirmed by X-ray diffractometry of the intermetallic compound CS. In other words, the intermetallic compound CS may be a solid solution containing Fe.

The content of the Me element (such as Fe) contained in the intermetallic compound CS can be measured by, for example, inductively coupled plasma atomic emission spectrometry (ICP). For example, a sample of the intermetallic compound CS is completely dissolved in a heated acid solution (e.g., a mixed acid of hydrofluoric acid, nitric acid and sulfuric acid), and the solution residue is removed by filtration, and then analyzed by ICP, to measure the spectral intensity of each element. Subsequently, using a commercially available standard solution of the element, a calibration curve is drawn, from which the content of each element contained in the intermetallic compound CS is calculated.

The Fe content in the intermetallic compound may be, for example, 1 mass % or less, may be 0.5 mass % or less, may be 0.3 mass % or less, and may be 0.1 mass % or less. When the intermetallic compound contains Fe, the lower limit of the Fe content until which the effect of Fe can be obtained is, for example, 0.001 mass % or more, and is 0.01 mass % or more. These upper and lower limits may be combined in any combination when setting the range of the content. For example, the Fe content in the intermetallic compound may be 0.001 mass % or more and 0.3 mass % or less, and may be 0.001 mass % or more and 0.1 mass % or less.

[Method for Producing Intermetallic Compound CS]

The intermetallic compound CS can be produced by weighing raw materials, melting the raw materials to form a molten metal, and then, cooling the molten metal.

For the raw materials, although not limited thereto, a simple substance material (e.g., metal lump, metal powder) of each constituent element of the intermetallic compound CS can be used. Melting of the raw materials is preferably performed using an arc melting furnace in an inert gas atmosphere, such as argon. When the molten metal is cooled, a metal lump containing constituent elements in a desired composition is obtained.

In the metal lump obtained by cooling the molten metal, the crystallization of the intermetallic compound has, in some cases, failed to proceed sufficiently. Therefore, it is desirable to anneal the metal lump by heating it in a reduced pressure of $2.0 \cdot 10^{-3}$ Pa or less or in a vacuum atmosphere. The heating temperature during annealing is not limited, but may be set at 600° C. or higher and 900° C. or lower. The heating time during annealing is not limited, but may be 10 hours or more and 120 hours or less.

[Secondary Battery]

A secondary battery according to an embodiment of the present disclosure includes a positive electrode, a negative electrode, and a non-aqueous electrolyte, and the negative electrode includes the above-described negative electrode active material (intermetallic compound CS). In the following, the secondary battery will be described in detail, with a lithium ion secondary battery taken as an example.

[Negative Electrode]

The negative electrode may include a negative electrode current collector, and a negative electrode mixture layer supported on a surface of negative electrode current collector. The negative electrode mixture layer can be formed by applying a negative electrode slurry of a negative electrode mixture dispersed in a dispersion medium, onto a surface of the negative electrode current collector, followed by drying. The applied film after drying may be rolled as needed.

The negative electrode mixture contains a negative electrode active material (intermetallic compound CS) as an essential component, and can contain a binder, conductive agent, thickener, and the like, as optional components.

The negative electrode active material may further contain, in addition to the intermetallic compound CS, a material that electrochemically absorbs and releases lithium ions. Such a material can include, but is not limited to, a carbon material. Examples of the carbon material include graphite, graphitizable carbon (soft carbon), and non-graphitizable carbon (hard carbon).

Examples of the negative electrode current collector include a non-porous conductive substrate (e.g., metal foil) and a porous conductive substrate (e.g., mesh, net, punched sheet). The negative electrode current collector may be made of, for example, stainless steel, nickel, a nickel alloy, copper, or a copper alloy.

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, methyl polyacrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). The binder may be used singly or in combination of two or more kinds.

Examples of the conductive agent include: carbons, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. The conductive agent may be used singly or in combination of two or more kinds.

Examples of the thickener include: cellulose derivatives (e.g., cellulose ethers), such as carboxymethyl cellulose (CMC) and modified products thereof (including salts such as Na salts), and methyl cellulose; saponificated products of polymers having vinyl acetate units, such as polyvinyl alcohol; and polyethers (e.g., polyalkylene oxide, such as polyethylene oxide). The thickener may be used singly or in combination of two or more kinds.

[Positive Electrode]

The positive electrode may include a positive electrode current collector, and a positive electrode mixture layer supported on a surface of the positive electrode current collector. The positive electrode mixture layer can be formed by applying a positive electrode slurry of a positive electrode mixture dispersed in a dispersion medium, onto a surface of the positive electrode current collector, and drying the slurry. The dry applied film may be rolled as needed.

The positive electrode mixture can contain a positive electrode active material as an essential component, and can contain a binder, a conductive agent, and the like as optional components.

As the positive electrode active material, for example, a lithium-containing composite oxide can be used. Examples thereof include $Li_aCoO_2$, $Li_aNiO_2$, $Li_aMnO_2$, $Li_aCo_bNi_{1-b}O_2$, $Li_aCo_bMe_{1-b}O_c$, $Li_aNi_{1-b}Me_bO_c$, $Li_aMn_2O_4$, $Li_aMn_{2-b}Me_bO_4$, $LiMePO_4$, $Li_2MePO_4F$, where Me is at least one selected from the group consisting of Na, Mg, Sc, Y, Mn, Fe, Co, Ni, Cu, Zn, Al, Cr, Pb, Sb, and B. Here, $a=0$ to 1.2, $b=0$ to 0.9, and $c=2.0$ to 2.3. The value a representing the molar ratio of lithium is subjected to increase and decrease during charging and discharging.

The binder and the conductive agent may be like those exemplified for the negative electrode. As the conductive agent, graphite, such as natural graphite and artificial graphite, may be used.

The form and the thickness of the positive electrode current collector may be respectively selected from the forms and the ranges corresponding to those of the negative electrode current collector. The positive electrode current collector may be made of, for example, stainless steel, aluminum, an aluminum alloy, or titanium.

[Electrolyte]

The electrolyte contains a solvent, and a lithium salt dissolved in the solvent. The concentration of the lithium salt in the electrolyte is preferably, for example, 0.5 mol/L or more and 2 mol/L or less. By controlling the lithium salt concentration within the above range, an electrolyte having excellent ion conductivity and moderate viscosity can be obtained. The lithium salt concentration, however, is not limited to the above.

The solvent may be aqueous or non-aqueous. Examples of the non-aqueous solvent include cyclic carbonic acid esters, chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL) and γ-valerolactone (GVL). The chain carboxylic acid esters are exemplified by methyl formate, ethyl formate, propyl formate, methyl acetate, ethyl acetate, propyl acetate, methyl propionate, ethyl propionate, and propyl propionate. The non-aqueous solvent may be used singly or in combination of two or more kinds.

Examples of the lithium salt include: $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylate, $LiCl$, $LiBr$, $LiI$, borates, and imides. Examples of the borates include lithium bis(1,2-benzenediolate(2-)-O,O') borate, lithium bis(2,3-naphthalenediolate(2-)-O,O') borate, lithium bis(2,2'-biphenyldiolate(2-)-O,O') borate, and lithium bis(5-fluoro-2-olate-1-benzenesulfonate-O,O') borate. Examples of the imides include lithium bisfluorosulfonyl imide (LiN(FSO_2)_2), lithium bis(trifluoromethanesulfonyl)imide (LiN(CF_3SO_2)_2), lithium trifluoromethanesulfonyl nonafluorobutanesulfonyl imide (LiN(CF_3SO_2)(C_4F_9SO_2)), and lithium bis(pentafluoroethanesulfonyl)imide (LiN(C_2F_5SO_2)_2). The lithium salt may be used singly or in combination of two or more kinds.

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of a polyolefin, such as polypropylene and polyethylene.

In an exemplary structure of the secondary battery, an electrode group is housed together with the electrolyte in an outer body. The electrode group may be a wound electrode group formed by winding the positive electrode and the negative electrode, with the separator interposed therebetween, may be a stacked electrode group formed by stacking the positive electrode and the negative electrode, with the separator interposed therebetween, and may be of a different form. The secondary battery may be of any type, such as cylindrical, prismatic, coin, button, or laminate type.

The present disclosure will be specifically described below with reference to Examples and Comparative Examples. It is to be noted, however, the present invention is not limited to the following Examples.

Example 1

[Production of Negative Electrode Active Material]

As raw materials, simple substance materials (metal lumps) of Ce, Ni, and Si were weighed in an atomic ratio of Ce:Ni:Si=1:2:2, and placed on a water-cooled copper hearth in an arc melting furnace. The atmosphere in the are melting furnace was then replaced with an argon atmosphere, and the raw materials were melted and rapidly cooled by an arc melting method, to obtain a button-shaped metal lump. Note that since the surface to come in contact with the water-cooled copper hearth is always in a cooled state, the sample is cooled instantly when the are irradiation is turned off. The resulting metal lump was turned upside down within the furnace using a turning bar, followed by melting and rapid cooling again by the are melting method, and was further turned upside down, followed by melting and rapid cooling. The above process was repeated five times to obtain a metal lump containing constituent elements in a composition of $CeNi_2Si_2$. Next, the obtained metal lump was enclosed in a quartz tube evacuated to a vacuum of $2.0 \cdot 10^{-3}$ Pa or less, and annealed at 800° C. for 48 hours, to allow crystallization to proceed sufficiently. The annealed metal lump was ground in a mortar to a particle size of 45 μm or less, and used as a negative electrode active material (intermetallic compound CS).

[X-Ray Diffractometry]

Figure 2A:
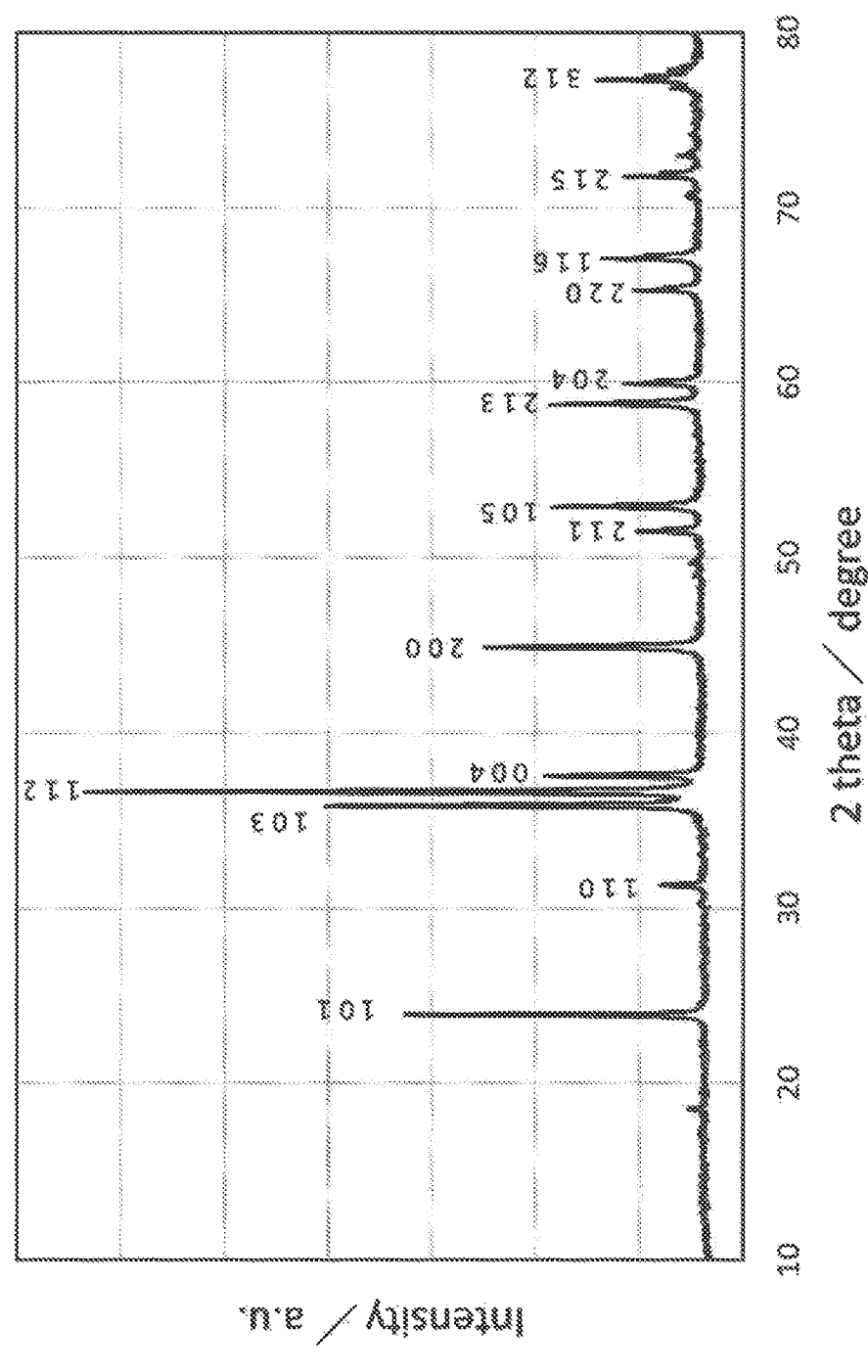
FIG. 2A A graph showing an X-ray diffraction pattern of an intermetallic compound.

An X-ray diffraction pattern of the obtained intermetallic compound CS is shown in FIG. 2A. Diffraction peaks can be observed at 2θ=23.919, 35.84°, 36.63°, and 44.88° in the X-ray diffraction pattern.

Further analysis of the X-ray diffraction pattern revealed that the obtained intermetallic compound CS belonged to a tetragonal crystal system, in which lattice constant a=4.027 Å and lattice constant c=9.557 Å. The d-value of the diffraction peak given by the hkl/index of 112 was 2.451 Å. The above results mean that the intermetallic compound CS of the present Example has a crystal structure approximately the same as shown in FIG. 1A.

[Preparation of Negative Electrode]

A negative electrode mixture containing the intermetallic compound CS, carbon black, SBR, and CMC at a mass ratio of 95:0.5:1.5:3.0 was mixed with an appropriate amount of water, to prepare a negative electrode slurry. Next, the negative electrode slurry was applied onto a surface of a copper foil, so that the mass of the negative electrode mixture per 1 m² of the copper foil was 150 g. The applied film was dried, and then rolled, to produce an electrode plate with a negative electrode mixture layer having a density of 2 g/cm³ formed on one side of the copper foil. The electrode plate was punched into a circle of 12.5 mm in diameter, and used as a negative electrode.

[Preparation of Counter Electrode]

A counter electrode was prepared by punching a 300-μm-thick metal lithium foil into a circle of 17 mm in diameter.

[Preparation of Liquid Electrolyte]

A liquid electrolyte was prepared by dissolving $LiPF_6$ at a concentration of 1.0 mol/L in a mixed solvent containing ethylene carbonate and ethyl methyl carbonate in a volume ratio of 1:3.

[Fabrication of Coin-Shaped Cell]

A bottomed cell case made of stainless steel having an opening was prepared, into which the negative electrode and a separator were placed in this order. The separator used here was a 0.45-mm-thick non-woven fabric made of polyphenylene sulfide (PPS). On the other hand, a sealing plate made of stainless steel provided with a polypropylene gasket at its periphery was prepared, and a lithium foil serving as a counter electrode was attached to the inner surface of the sealing plate. After injecting the liquid electrolyte into the cell case, the opening of the cell case was closed with the sealing plate, to completer a cell A1. The cell size was set to 20 mm in diameter and 3.2 mm in thickness.

[Charge-Discharge Curve]

Figure 3:
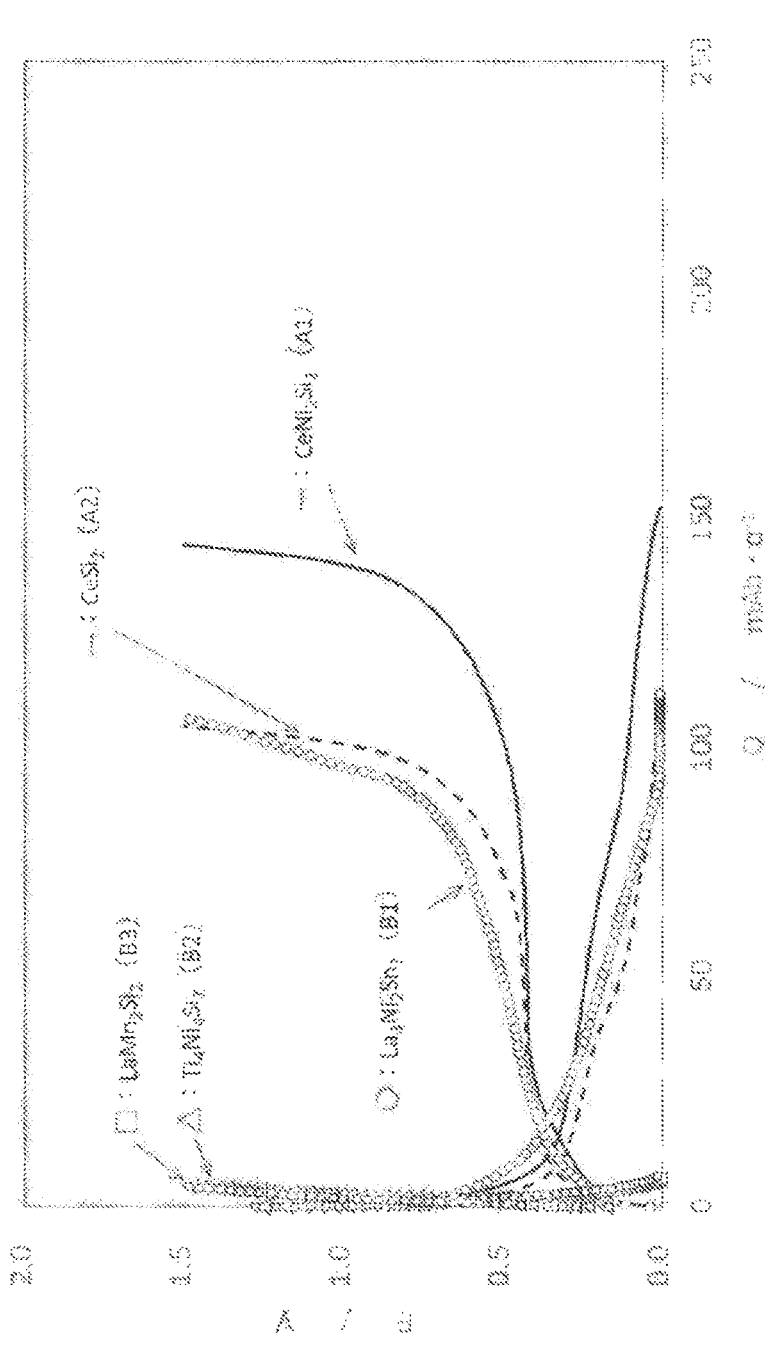
FIG. 3 A graph showing charge-discharge curves of cells of Examples and Comparative Examples.

With respect to the fabricated cell Al, at 25° C., the negative electrode was charged at 0.1 mA to 0.01 V, and subsequently, the negative electrode was discharged to 1.5 V. A charge-discharge curve at this first charge-discharge cycle is shown in FIG. 3. A discharge capacity at the first cycle, and a ratio of the discharge capacity to the charge capacity (initial efficiency) are shown in Table 1. FIG. 3 and Table 1 show that the cell A1 has a capacity density of 145 mAh/g. Also, the initial efficiency was high, which was 79%.

TABLE 1

|  | A1 | A2 | B1 | B2 | B3 |
|---|---|---|---|---|---|
| Intermetallic compound | $CeNi_2Si_2$ | $CeSi_2$ | $La_3Ni_2Sn_7$ | $Ti_4Ni_4Si_7$ | $LaMn_2Si_2$ |
| Space group | I4/mmm | I41/amd | Cmmm | I4/mmm | I4/mmm |
| Discharge capacity (mAh/g) | 145 | 105 | 105 | 5 | 10 |
| Initial efficiency (%) | 79 | 75 | 74 | 72 | 30 |

Example 2

[Production of Negative Electrode Active Material]

As raw materials, simple substance materials (metal lumps) of Ce and Si were weighed in an atomic ratio of Ce:Si=1:2, and placed on a water-cooled copper hearth in an arc melting furnace. A negative electrode active material of Example 2 was obtained in the same manner as in Example 1, except the raw materials.

[X-Ray Diffractometry]

Figure 2B:
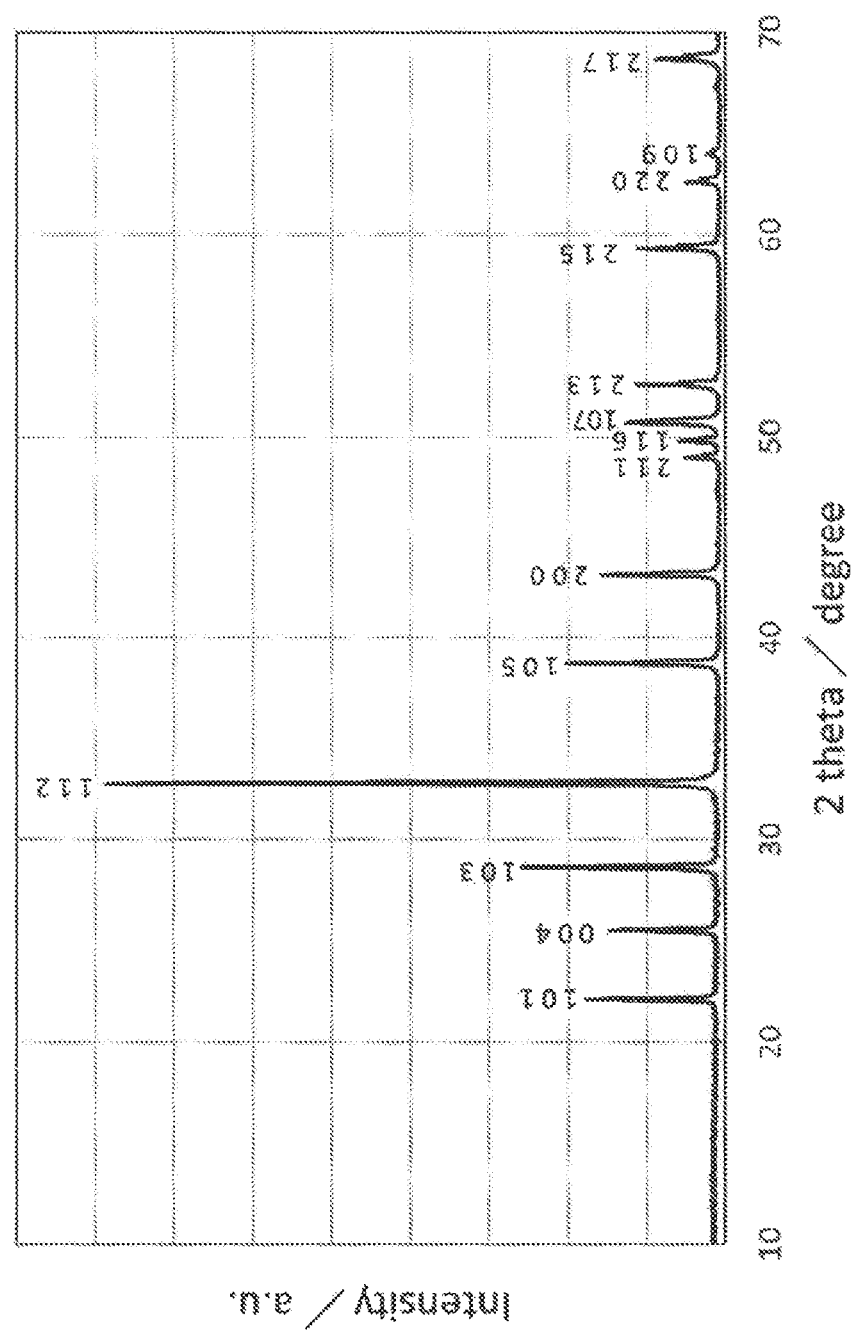
FIG. 2B A graph showing another X-ray diffraction pattern of an intermetallic compound.

An X-ray diffraction pattern of the obtained intermetallic compound CS is shown in FIG. 2B. Diffraction peaks can be observed at 2θ=22.02, 28.6°, 32.7°, and 38.7° in the X-ray diffraction pattern.

Further analysis of the X-ray diffraction pattern revealed that the obtained intermetallic compound CS belonged to a tetragonal crystal system, in which lattice constant a=4.15 Å and lattice constant c=13.88 Å. The d-value of the diffraction peak given by the hkl index of 112 was 2.71 Å. The above results mean that the intermetallic compound CS of the present Example has a crystal structure approximately the same as shown in FIG. 1B.

[Preparation of Negative Electrode]

A cell A2 was fabricated and evaluated in the same manner as in Example 1, except that the obtained intermetallic compound ($CeSi_2$) was used as the negative electrode active material. The charge-discharge curve at the first cycle is shown in FIG. 3. The discharge capacity at the first cycle, and the initial efficiency are shown in Table 1.

FIG. 3 and Table 1 show that that the cell A2 has a capacity density of approximately 105 mAb/g. The cell A2 is more excellent in the flatness of the discharge curve than a below-described cell B1. The initial efficiency was high, which was about 75%.

Comparative Example 1

Figure 4:
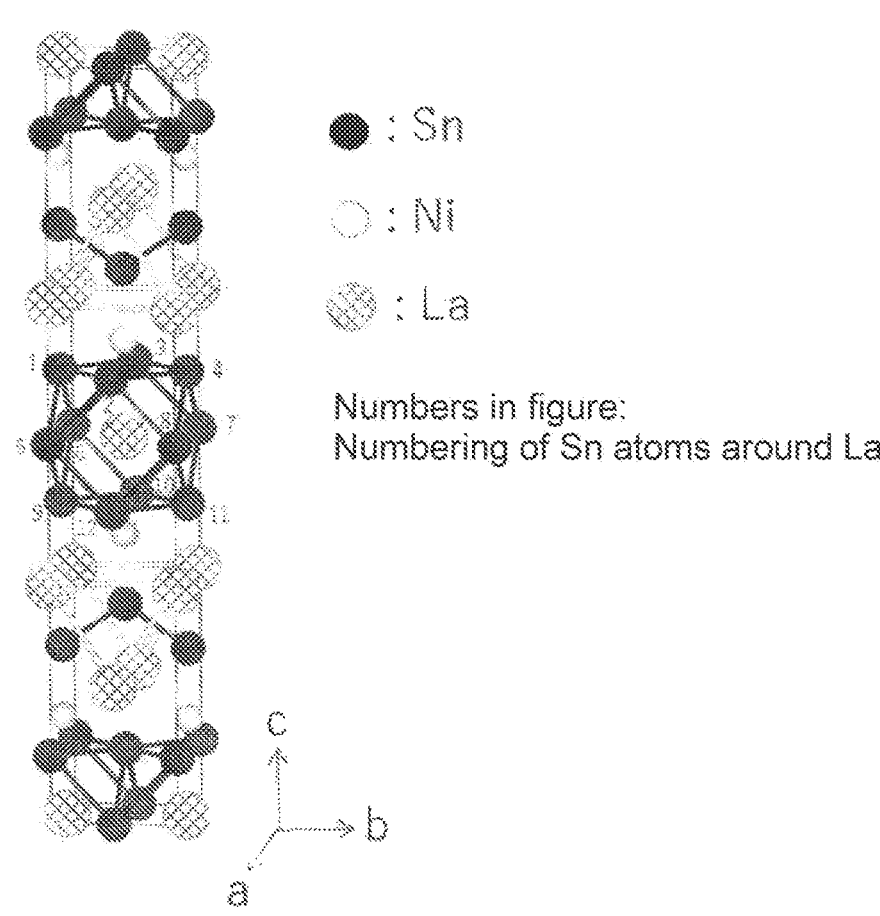
FIG. 4 A diagram showing a crystal structure of a negative electrode active material ($La_3Ni_2Sn_7$) of Comparative Example.

A cell B1 was fabricated and evaluated in the same manner as in Example 1, except that an intermetallic compound ($La_3Ni_2Sn_7$) having a crystal structure as shown in FIG. 4 was used as the negative electrode active material. The charge-discharge curve at the first cycle is shown in FIG. 3. The discharge capacity at the first cycle, and the initial efficiency are shown in Table 1.

$La_3Ni_2Sn_7$ has a symmetry belonging to the Cmmm space group. One cage structure is included at the center of the unit lattice; however, the central atom is La, and 12 Sn atoms are arranged in a cage-like form so as to surround La. Since $La_3Ni_2Sn_7$ contains Sn as a major component, the capacity density is small, and the cell A1 of Example 1 is more excellent than the cell B1 in terms of the capacity density and the initial efficiency.

Comparative Example 2

Figure 5:
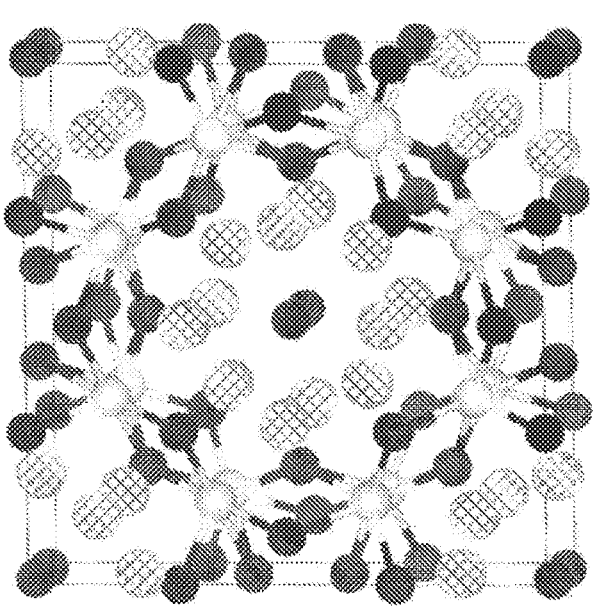
FIG. 5 A diagram showing a crystal structure of a negative electrode active material ($Ti_4Ni_4Si_7$) of Comparative Example.

A cell B2 was fabricated and evaluated in the same manner as in Example 1, except that an intermetallic compound ($Ti_4Ni_4Si_7$) having a crystal structure as shown in FIG. 5 was used as the negative electrode active material. The charge-discharge curve at the first cycle is shown in FIG. 3. The discharge capacity at the first cycle, and the initial efficiency are shown in Table 1.

$Ti_4Ni_4Si_7$ is an intermetallic compound containing Ti in place of Ce, and has a crystal structure significantly different from that of $CeNi_2Si_2$. Also, $Ti_4Ni_4Si_7$ has almost no electrochemical activity. This indicates that a capacity density as high as that of $CeNi_2Si_2$ cannot be obtained simply because the kinds of elements are in common.

Comparative Example 3

Figure 6:
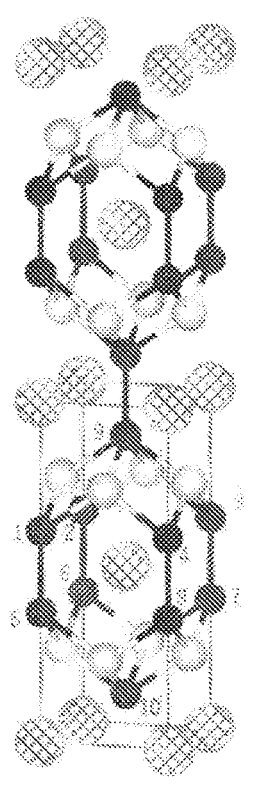
FIG. 6 A diagram showing a crystal structure of a negative electrode active material ($LaMn_2Si_2$) of Comparative Example.

A cell B3 was fabricated and evaluated in the same manner as in Example 1, except that an intermetallic compound ($LaMn_2Si_2$) having a crystal structure as shown in FIG. 6 was used as the negative electrode active material. The charge-discharge curve at the first cycle is shown in FIG. 3. The discharge capacity at the first cycle, and the initial efficiency are shown in Table 1.

$LaMn_2Si_2$ has a cage structure, the central atom is La, and 10 Si atoms and 8 Ni atoms are arranged in a cage-like form so as to surround La. $LaMn_2Si_2$ has a symmetry similar to that of $CeNi_2Si_2$, and is also similar thereto in the crystal structure. However, $LaMn_2Si_2$ has almost no electrochemical activity. This indicates that the capacity density greatly depends on the kinds of elements.

Examples 3 and 4

As raw materials, single substance materials (metal lumps) of Ce and Si were weighed in an atomic ratio of Ce:Si=1:2, to which a predetermined amount of Fe was further added. The raw materials were placed on a water-cooled copper hearth in an ark melting furnace. Except for the above, in the same manner as in Example 2, a negative electrode active material (intermetallic compound CS-1) of Example 3 with an Fe content of 0.06 mass %, and a negative electrode active material (intermetallic compound CS-2) of Example 4 with an Fe content of 1.03 mass % were obtained.

Figure 7:
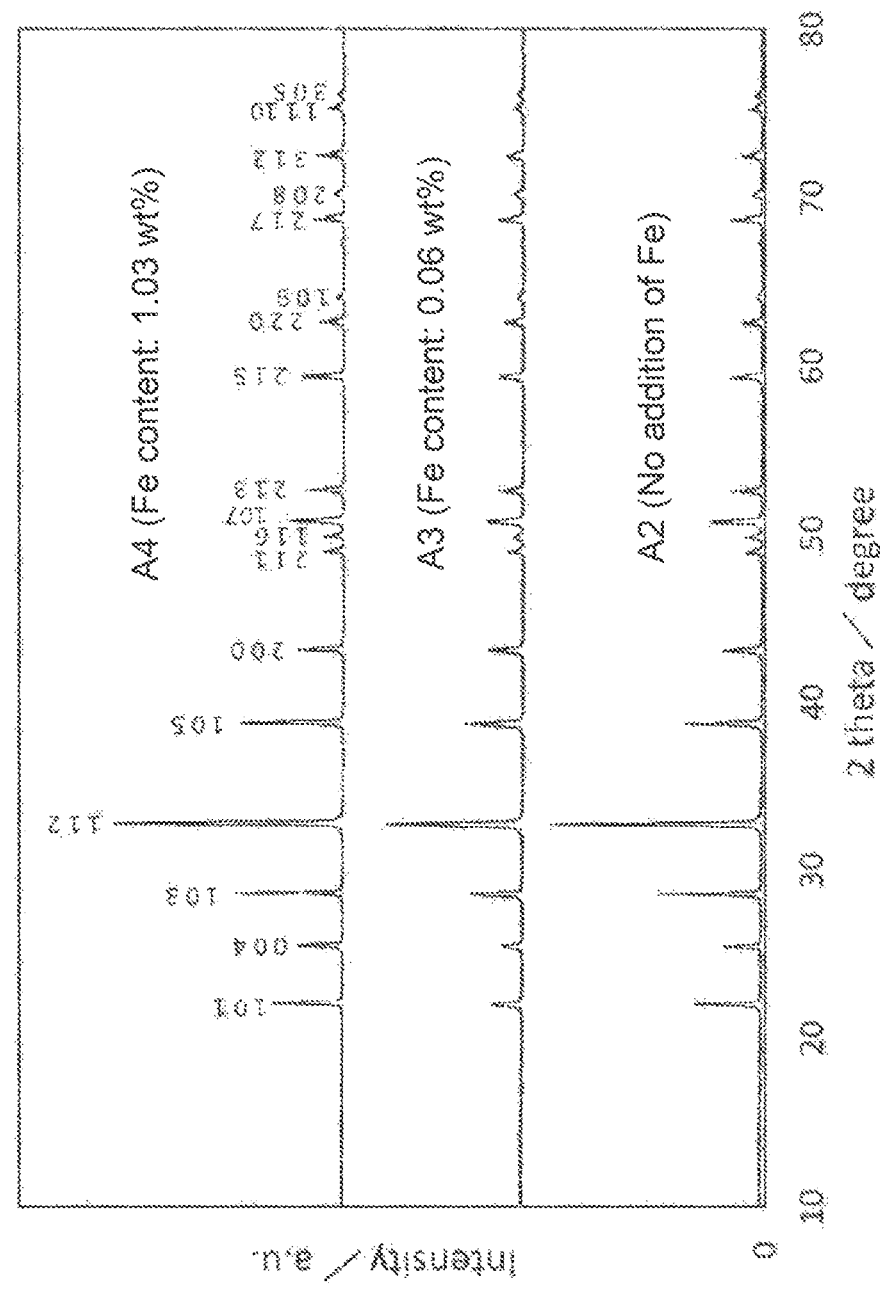
FIG. 7 A graph showing still other X-ray diffraction patterns of intermetallic compounds.

X-ray diffraction patterns of the intermetallic compounds CS-1 and CS-2 are shown in FIG. 7. As shown in FIG. 7, the X-ray diffraction patterns of the Fe-containing intermetallic compounds CS are substantially the same as that of the intermetallic compound CS of Example 2 with no addition of a predetermined amount of Fe, and no significant difference was observed. It can be said therefore that the intermetallic compounds CS-1 and CS-2 have a crystal structure approximately the same as shown in FIG. 1B.

Figure 8:
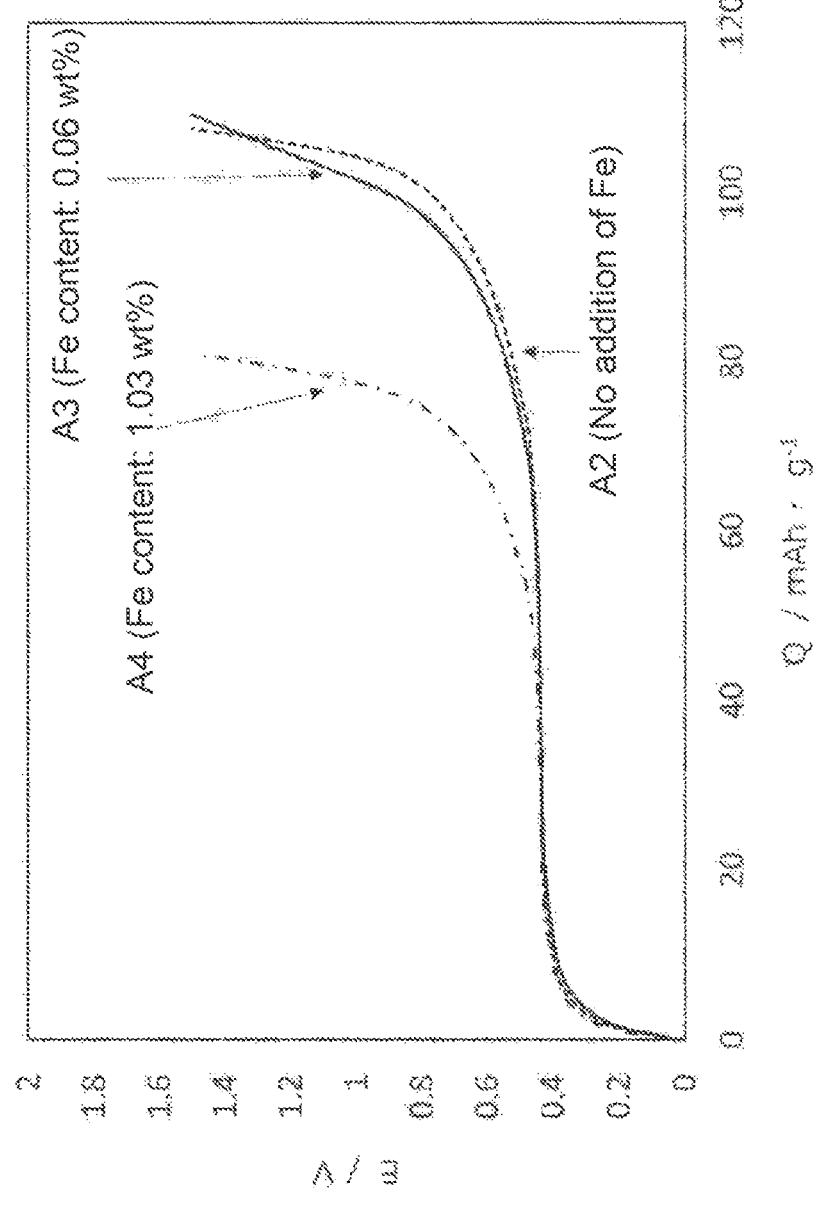
FIG. 8 A graph showing other charge-discharge curves of cells of Examples.

Next, a cell A3 of Example 3 and a cell A4 of Example 4 were fabricated in the same manner as in Example 1, except that the intermetallic compound CS-1 and the intermetallic compound CS-2 were respectively used as the negative electrode active material. With respect to the fabricated cells A3 and A4 and the cell A2 of Example 2, at 25° C., the negative electrode was charged to 0.01 V at 0.5 mA, which was a rate higher than that in Examples 1 and 2 and Comparative Examples 1 to 3, and subsequently, the negative electrode was discharged to 1.5 V. The charge-discharge curves at this first charge-discharge cycle are shown in FIG. 8. The discharge capacities at the first cycle are shown in Table 2. In Table 2, the Fe content of A2 is indicated as "–", as Fe was not added when obtaining the intermetallic compound CS.

In Examples 1 and 2 using the intermetallic compound CS to which Fe was not added, the prepared negative electrode slurry showed a tendency of gelling during producing the negative electrode, but in Examples 3 and 4, the negative electrode slurry was stable, and no gelling was observed.

TABLE 2

|  | A2 | A3 | A4 |
|---|---|---|---|
| Fe content (wt %) | — | 0.06 | 1.03 |
| Discharge capacity (mAh/g) | 107.4 | 109.1 | 80.9 |

FIG. 8 and Table 2 show that the addition of a small amount of Fe in the intermetallic compound CS can increase the discharge capacity. However, when the Fe content in the intermetallic compound CS has increased, the discharge capacity has dropped. It can be seen therefore that the Fe content is desirably 0.001 mass % or more and 0.3 mass % or less, more desirably 0.001 mass % or more and 0.1 mass % or less. On the other hand, the higher the Fe content was, the more stable the negative electrode slurry was.

Although $CeSi_2$ of Example 2 was used as the base of the intermetallic compound CS in the above Examples 3 and 4, a similar tendency can be observed when $CeNi_2Si_2$ of Example 1 is used as the base, in terms of the improvement in capacity and the stability of the negative electrode slurry.

INDUSTRIAL APPLICABILITY

The negative electrode active material for a secondary battery according to the present disclosure is useful as a negative electrode active material for a secondary battery used in mobile applications (e.g., electric cars, mobile communication devices, portable electronic devices).

The invention claimed is:

1. A negative electrode active material for a secondary battery, comprising
   an intermetallic compound having a cage structure, wherein
   the cage structure is constituted of at least one first atom located within a cage, and a plurality of second atoms arranged in a cage-like form so as to surround the first atom,
   the first atom is a cerium atom, and
   the plurality of the second atoms include 8 or more and 16 or less silicon atoms and 7 or more and 9 or less nickel atoms, and
   an atomic ratio of the silicon atoms to the nickel atoms (Si/Ni ratio) is 1 to 1.3.
2. The negative electrode active material for a secondary battery according to claim 1, wherein the intermetallic compound has a phase represented by a general formula: $Ce_xNi_ySi_z$ where x=1, $1 \leq z/y \leq 1.3$, and $1 < z < 4$.

3. The negative electrode active material for a secondary battery according to claim 1, wherein the number of the silicon atoms included in the plurality of the second atoms is 9 or more and 12 or less.

4. The negative electrode active material for a secondary battery according to claim 1, wherein the intermetallic compound includes at least a phase of $CeNi_2Si_2$.

5. The negative electrode active material for a secondary battery according to claim 1, wherein an X-ray diffraction pattern of the intermetallic compound has diffraction peaks (1) at or around $2\theta=23.9°$, (2) at or around $2\theta=35.8°$, (3) at or around $2\theta=36.6°$, and (4) at or around $2\theta=44.9°$.

6. The negative electrode active material for a secondary battery according to claim 1, wherein the intermetallic compound belongs to a tetragonal or orthorhombic crystal system, and when belonging to the tetragonal crystal system, lattice constants a and c determined by X-ray diffractometry satisfy 3.0 Å≤a≤4.5 Å, and 7 Å≤c≤15 Å, and when belonging to the orthorhombic crystal system, lattice constants a, b, and c determined by X-ray diffractometry satisfy 3.0 Å≤a≤4.5 Å, 3.0 Å≤b≤4.5 Å, and 7 Å≤c≤15 Å.

7. The negative electrode active material for a secondary battery according to claim 1, wherein in the X-ray diffraction pattern of the intermetallic compound, a d-value of a diffraction peak given by an hkl index of 112 is 2.38 Å or more and 2.52 Å or less.

8. The negative electrode active material for a secondary battery according to claim 1, wherein the intermetallic compound contains an atom Me different from any of Ce, Ni, and Si, and the atom Me includes at least Fe.

9. The negative electrode active material for a secondary battery according to claim 8, wherein an Fe content in the intermetallic compound is 2 mass % or less.

10. The negative electrode active material for a secondary battery according to claim 8, wherein an Fe content in the intermetallic compound is 0.001 mass % or more.

11. A secondary battery, comprising:

a positive electrode; a negative electrode; and an electrolyte, wherein the negative electrode includes the negative electrode active material for a secondary battery of claim 1.

* * * * *